US012589788B2

(12) United States Patent
Owens et al.

(10) Patent No.: US 12,589,788 B2
(45) Date of Patent: Mar. 31, 2026

(54) GROCERY CONTAINMENT SYSTEM FOR LAST MILE OF ORDER FULFILLMENT

(71) Applicant: VESTURE LLC, Asheboro, NC (US)

(72) Inventors: Byron C. Owens, Asheboro, NC (US); Henry Chad Brown, Asheboro, NC (US)

( * ) Notice: Subject to any disclaimer, the term of this patent is extended or adjusted under 35 U.S.C. 154(b) by 305 days.

(21) Appl. No.: 18/421,031

(22) Filed: Jan. 24, 2024

(65) Prior Publication Data

US 2024/0300564 A1    Sep. 12, 2024

Related U.S. Application Data

(60) Provisional application No. 63/451,490, filed on Mar. 10, 2023.

(51) Int. Cl.
B62B 3/14          (2006.01)

(52) U.S. Cl.
CPC .............. B62B 3/1496 (2013.01); B62B 3/14 (2013.01); B62B 2204/06 (2013.01)

(58) Field of Classification Search
CPC ..... B62B 3/14; B62B 3/1496; B62B 2204/06; B62B 3/1424; B62B 3/1416; B62B 3/1476; B62B 3/1464; B62B 3/00
See application file for complete search history.

(56) References Cited

U.S. PATENT DOCUMENTS

| | | | |
|---|---|---|---|
| 1,005,609 A | 10/1911 | Crawford-Frost | |
| 4,953,878 A | 9/1990 | Sbragia | |
| 6,944,981 B1 * | 9/2005 | Garberg | |
| 8,209,995 B2 | 7/2012 | Kieling et al. | |
| 9,205,853 B2 * | 12/2015 | Faber | |
| 9,436,770 B2 | 9/2016 | Hattrup et al. | |
| 10,583,853 B2 * | 3/2020 | Brilhante | |
| 10,915,936 B1 * | 2/2021 | Vora | |
| 11,577,769 B2 * | 2/2023 | Ting | |

(Continued)

FOREIGN PATENT DOCUMENTS

| | | | | |
|---|---|---|---|---|
| GB | 2415417 A | * 12/2005 | ............. | B62B 3/027 |
| KR | 20190139091 A | * 12/2019 | ............... | B62B 5/00 |

OTHER PUBLICATIONS

Insulated shopping cart sold at amazon. (Year: 2023).*

*Primary Examiner* — James A Shriver, II
*Assistant Examiner* — Nicholas R. Kandas
(74) *Attorney, Agent, or Firm* — TILLMAN WRIGHT, PLLC; Chad D. Tillman

(57)          ABSTRACT

A cart assembly includes a cart and a container assembly that is removably supported on the cart. The container assembly may simply rest on a platform of the cart, or may be removable secured to the cart. The container assembly includes a crate and a liner that is removably received within and supported by walls defining an interior cargo space of the crate. The liner itself includes walls containing a phase change material. The walls may be defined by panels having interior spaces in which components encasing the phase change material are contained. The liners are collapsed and stored in a freezer until needed. The liners are then placed within the crates and food items requiring refrigeration are placed within the lined cargo spaced of the crates. The crates are then staged awaiting customer pickup or packed in a vehicle for customer delivery all without further refrigeration.

20 Claims, 10 Drawing Sheets

(56)         References Cited

U.S. PATENT DOCUMENTS

| 2006/0207989 | A1 |   | 9/2006 | Ritchie et al. |
| 2016/0300455 | A1 |   | 10/2016 | Hutchings et al. |
| 2016/0347338 | A1 | * | 12/2016 | Dupriest |
| 2019/0047775 | A1 |   | 2/2019 | Waltermire et al. |
| 2019/0254865 | A1 |   | 8/2019 | Eddy |
| 2020/0109889 | A1 |   | 4/2020 | Kieling et al. |

* cited by examiner

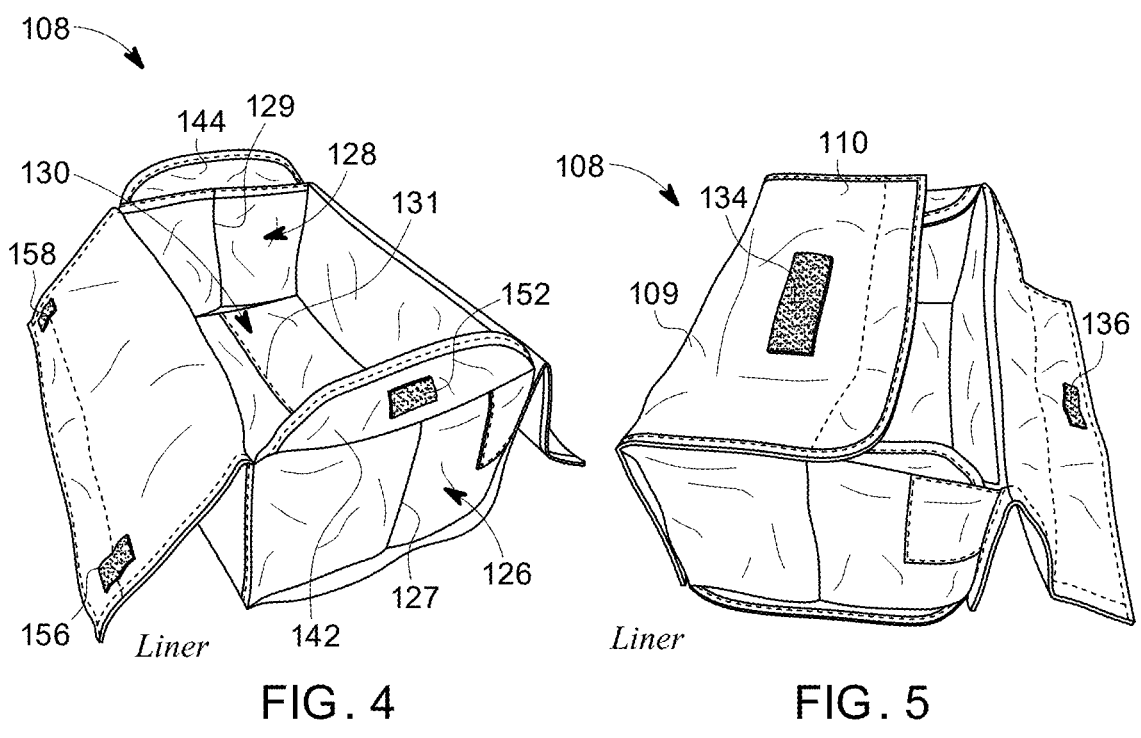
FIG. 4
FIG. 5
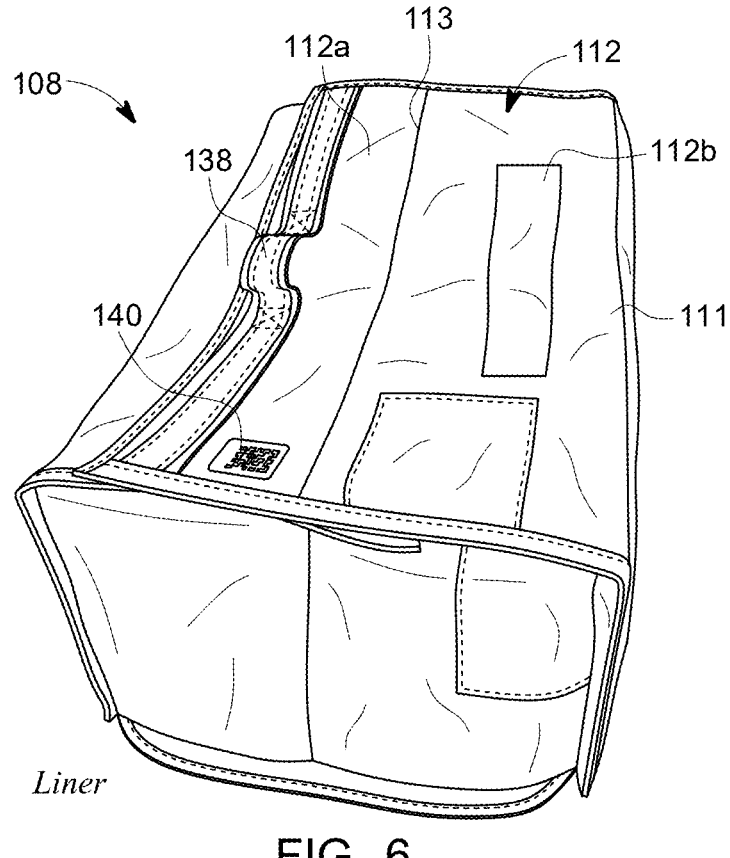
FIG. 6

106

*Crate*

114

106

*Crate*

*Crate*

*Crate*

*Crate*

*Container Assembly*

*Container Assembly*

*Container Assembly*

*Container Assembly*

*Cart*

1

GROCERY CONTAINMENT SYSTEM FOR LAST MILE OF ORDER FULFILLMENT

COPYRIGHT STATEMENT

BACKGROUND OF THE INVENTION

The invention generally relates to the temporary storage of items at temperatures above ambient temperature or below ambient temperature during staging and/or transport, and in particular, preferably to a grocery containment system for last mile of order fulfillment for use by a grocer.

In this fast paced world, consumers are constantly adapting to new uses of technologies throughout their daily routines. In recent years, consumers have shifted from traditional grocery shopping to online ordering utilizing pickup or delivery services. As a result, grocers including grocery stores have adopted advanced technologies in order to insure freshness, quality, and safety by monitoring product temperatures from the shelf to the consumer's car or doorstep. Doing so, however, has required either the use of refrigeration including refrigerated coolers and freezers (such as specialized lockers) for staging of customer orders after picking, or the use of ice packs or gel packs, all in order to maintain safekeeping of the food items within food and health safety requirements, whether for customer pickup or deliver to the customer.

In view of the foregoing, it is believed that a need exists for continued innovations and improvements in apparatus and methods for maintaining safe temperatures of food items during staging while awaiting customer pickup or delivery. This, and other needs, are believed to be addressed by one or more aspects and features of the invention.

SUMMARY OF THE INVENTION

The invention includes many aspects and features. Moreover, while many aspects and features relate to, and are described in, the context of maintaining food items at safe temperatures during customer delivery or while awaiting customer pickup, especially including those food items requiring refrigeration whether above or below freezing, the invention is not limited to use only in such context, as will become apparent from the following summaries and detailed descriptions of aspects, features, and one or more embodiments of the invention. Indeed, the invention includes use of at least some preferred embodiments to heat food items and maintain food items at temperatures greater than ambient temperatures.

In an aspect of the invention, a cart assembly comprises a cart and a container assembly that is removably supported on the cart. The container assembly may simply rest on or within a platform of the cart, or may be removable secured to the cart. The container assembly comprises a crate and a liner that is removably received within and supported by walls of the crate. The liner may simply rest on or within an interior cargo space of the crate defined by the walls of the crate or may be removably secured to the crate, such as by hook-and-loop fasteners. The liner itself comprises walls containing a phase change material. The walls may be defined by panels having interior spaces in which encasements containing the phase change material are contained. An encasement may have a plank shape with rectangular profile.

In a feature, the phase change material has a phase change temperature above ambient temperature, the liner being configured to keep the cargo space of the container assembly at a temperature that is above ambient temperature.

In a feature, the phase change material has a phase change temperature below ambient temperature, the liner being configured to keep an interior cargo space of the container assembly at a temperature that is below ambient temperature.

In a feature, the cart comprises a platform upon which the container assembly is placed.

In a feature, the cart assembly comprises a second container assembly, the second container assembly comprising a crate and a liner removably received within and supported by walls of the crate, the liner of the second container assembly comprising walls also containing a phase change material.

In a feature, the cart assembly further comprises wheels and a handle by which the cart assembly is manually pushed or pulled, and an electronic device attached to the handle by a mount. The electronic device preferably is used to track items that are picked and placed in each container assembly of the cart assembly. The electrical device preferably is an iPad that is mounted to the handle of the cart and that includes a scanning functionality (hardware and software) for reading product bar codes.

In a feature, the cart is configured to transition into a collapsed configuration for storage when not in use.

In a feature, the crate is configured to transition into a collapsed configuration when not in use and the liner is removed. The crate preferably is configured to stack on top of other, identical crates when also in the collapsed configuration with the liners removed.

In a feature, the liner is collapsible when not in use and removed from the crate. The liner preferably comprises panels, each panel being defined by one or more exterior walls and one or more interior walls defining therebetween spaces in which the phase change material is contained. The phase change material may be in the form of removable inserts that are received through slots or other openings in the walls of the liner. In such scenario, the slots or other openings preferably are closable for secure retention of the inserts within the walls of the liner.

In a feature, the liner comprises a front panel, a back panel, a first end panel, and a second end panel, each said panel being connected along a fold line to a bottom panel for pivoting movement therebetween.

In additional features related thereto, the bottom panel comprises first and second subpanels that are connected along a fold line for pivoting movement therebetween. The first end panel comprises a pair of subpanels that are connected along a fold line for pivoting movement therebetween, and the second end panel comprises a pair of subpanels that are connected along a fold line for pivoting movement therebetween. The fold lines of the first and second end panels and the bottom panel lie within a plane, whereby the liner is transitionable between a collapsed configuration and an erected configuration by being folded along these fold lines.

In still additional feature related thereto, the liner further comprise a first cover panel that is connected along a fold line to a top of the back panel for pivoting movement therebetween, and a second cover panel that is connected along a fold line to a top of the front panel for pivoting movement therebetween. The first cover panel and the second cover panel, when in their closed positions, are configured to cover a top opening of the liner that provides access to an interior cargo space of the liner. The second cover panel overlaps and extends over the first cover panel when the first and second cover panels are in their closed positions. An outside wall of the first cover panel includes a first fastening component and an inside wall of the second cover panel includes a second fastening component that engages the first fastening component for securing the first and second cover panels in their closed positions. The fastening components may comprise hook-and-loop fasteners, and alternatively, the fastening components may comprise magnetic fasteners. When fastened together, the liner in its erected configuration preferable is stable. The second cover panel comprises a handle to facilitate separating the second cover panel from the first cover panel when secured together by the fastening components.

In still yet additional features related thereto, the liner further comprises a pair of upper flaps and a pair of lower flaps. The first upper flap is connected by a fold line along a top of the first end panel, and the second upper flap is connected by a hinge along a top of the second end panel. The first lower flap is connected by a hinge along a bottom of the first end panel, and the second lower flap is connected by a hinge along a bottom of the second end panel. The upper flaps are tucked under the first and second cover panels when in their closed positions for enclosing any gaps into the interior cargo space along upper side edges of liner. Each upper flap comprises a fastening component that mates with a corresponding fastening component located on an inside wall of the first cover panel for maintaining the upper flaps in their enclosing positions.

In a feature, the liner comprises a machine-readable unique identifier. The machine-readable unique identifier may comprise a bar code, an RFID tag, or other mechanism whereby the liner is uniquely identified by an external device capable of reading the machine-readable unique identifier.

In a feature, the liner comprises one or more temperature sensors and electronic components including a microprocessor or controller, a transceiver, and memory for monitoring, recording, and/or communicating temperature data.

In a feature, the crate comprises a machine-readable unique identifier. The machine-readable unique identifier may comprise a bar code, an RFID tag, or other mechanism whereby the crate is uniquely identified by an external device capable of reading the machine-readable unique identifier. Preferably, the same device is capable of reading both the machine-readable unique identifier of the liner and the machine-readable unique identifier of the crate. The device may comprise the electronic device used to track the food items that are picked and that may be mounted to the cart. Wireless protocols including Bluetooth for example may be used for such electronic communications.

In another aspect, a container assembly comprises a crate and a liner removably received within and supported by walls of the crate, wherein the liner comprises walls containing a phase change material.

In yet another aspect, a liner for lining a crate comprises a plurality of panels connected together at fold lines. The panels define a generally box shaped configuration when the liner is erected for lining the crate, and a plurality of the panels of the liner comprise a phase change material. The plurality may be some or all of the panels of the liner.

In a feature, the phase change material has a phase change temperature above ambient temperature, the liner being configured to keep an interior cargo space of the container assembly at a temperature that is above ambient temperature.

In a feature, the phase change material has a phase change temperature below ambient temperature, the liner being configured to keep an interior cargo space of the container assembly at a temperature that is below ambient temperature.

In a feature, the liner is collapsible when not in use and removed from the crate.

In a feature, the liner comprises panels, each panel being defined by one or more exterior walls and one or more interior walls defining therebetween spaces in which the phase change material is contained.

In a feature, the liner comprises a front panel, a back panel, a first end panel, and a second end panel, each said panel being connected along a fold line to a bottom panel for pivoting movement therebetween.

In additional features, the bottom panel comprises first and second subpanels that are connected along a fold line for pivoting movement therebetween. The first end panel comprises a pair of subpanels that are connected along a fold line for pivoting movement therebetween, and the second end panel comprises a pair of subpanels that are connected along a fold line for pivoting movement therebetween. The fold lines of the first and second end panels and the bottom panel lie within a common plane such that the liner is transitionable between a collapsed configuration and an erected configuration by being folded along these fold lines in the common plane.

In yet additional feature, the liner further comprise a first cover panel that is connected along a fold line to a top of the back panel for pivoting movement therebetween, and a second cover panel that is connected along a fold line to a top of the front panel for pivoting movement therebetween. The first cover panel and the second cover panel, when in their closed positions, are configured to cover a top opening of the liner. The second cover panel overlaps and extends over the first cover panel when the first and second cover panels are in their closed positions. An outside wall of the first cover panel includes a first fastening component and an inside wall of the second cover panel includes a second fastening component that engages the first fastening component for securing the first and second cover panels in their closed positions. The fastening components may comprise hook-and-loop fasteners, and alternatively, the fastening components comprise magnetic fasteners. The second cover panel preferably comprises a handle to facilitate separating the second cover panel from the first cover panel when secured together by the fastening components.

In still yet additional features, the liner further comprises a pair of upper flaps and a pair of lower flaps. The first upper flap is connected by a fold line along a top of the first end panel, and the second upper flap is connected by a hinge along a top of the second end panel. The first lower flap is connected by a hinge along a bottom of the first end panel, and the second lower flap is connected by a hinge along a bottom of the second end panel. The upper flaps are tucked under the first and second cover panels when in their closed positions for enclosing gaps into an interior cargo space along upper side edges of the liner when erected. Each upper flap preferably comprises a fastening component that mates with a corresponding fastening component located on an inside wall of the first cover panel.

In another aspect, a method is used for storing liners so that the liners are ready for use in cooling applications, each liner comprising a plurality of panels that define a generally box shaped configuration when the liner is erected for lining a crate, a plurality of the panels of the liner comprising a phase change material. The method comprises (a) collapsing the erected liners to a generally slim height and vertically stacking the liners on top of each other in a walk-in freezer, the step of collapsing the erected lines comprising collapsing each liner by folding the liner along fold lines that lie within a common plane, the fold lines comprising a fold line in a first end panel of the liner, a fold line within a bottom panel of the liner, and a fold line within a second end panel of the liner that is opposite to the first end panel of the liner; and (b) maintaining a temperature within the walk-in freezer at or below a phase change temperature of the phase change material of each of the stacked liners.

In features, the liners are configured to line crates that are collapsible, and the method further comprises maintaining a stacked plurality of collapsed crates outside of the walk-in freezer.

In an aspect, a method relates to storing liners so that the liners are ready for use in cooling applications, each liner comprising a plurality of panels that define a cargo-carrying configuration such as a box shape when the liner is erected for lining a crate, a plurality of the panels of the liner comprising a phase change material. The method comprises (a) collapsing the erected liners to a generally slim height and vertically stacking the liners on top of each other in a temperature-controlled area, the step of collapsing the erected lines comprising collapsing each liner by folding the liner along fold lines that lie within a common plane, the fold lines comprising a fold line in a first end panel of the liner, a fold line within a bottom panel of the liner, and a fold line within a second end panel of the liner that is opposite to the first end panel of the liner; and (b) maintaining a temperature within the temperature-controlled area at or below a phase change temperature of the phase change material of each of the stacked liners.

In a feature, the temperature-controlled area comprises a walk-in freezer.

In a feature, the temperature-controlled area comprises a walk-in cooler.

Another method relates to storing liners so that the liners are ready for use in heating applications. In this method, each liner comprises a plurality of panels that define a cargo-carrying configuration such as a box shape when the liner is erected for lining a crate, a plurality of the panels of the liner comprising a phase change material. The method comprises the steps of (a) collapsing the erected liners to a generally slim height and vertically stacking the liners on top of each other in a temperature-controlled area, the step of collapsing the erected lines comprising collapsing each liner by folding the liner along fold lines that lie within a common plane, the fold lines comprising a fold line in a first end panel of the liner, a fold line within a bottom panel of the liner, and a fold line within a second end panel of the liner that is opposite to the first end panel of the liner; and (b) maintaining a temperature within the temperature-controlled area at or above a phase change temperature of the phase change material of each of the stacked liners.

In an aspect, a method relates to a method of fulfilling a customer order for food items at a grocer. The method comprises (a) storing a plurality of liners each in a collapsed configuration in a stack in a walk-in freezer, each said liner comprising a phase change material having a phase change temperature that is above a temperature of the walk-in freezer and below ambient temperature of the area in which the walk-in freezer is located at the grocer; (b) storing a plurality of crates each in a collapsed configuration in a stack outside of the walk-in freezer at the grocer; (c) erecting one of the plurality of liners, the phase change material of the erected liner having a temperature at or below its phase change temperature as a result of being stored in the walk-in freezer; (d) erecting one of the plurality of collapsed crates; (e) positioning the erected liner within the erected crate such that the liner lines a cargo space of the crate; (f) picking food items of the customer order, each picked food item that requires refrigeration being placed within the lined cargo space of the crate; and (g) staging the crate with food items of the customer order contained therein in an area of the grocer that is at ambient temperature.

In a feature, staging the crate does not comprise placing the crate in a refrigerated space.

In a feature, staging the crate comprises staging the crate for customer pickup by stacking the crate with other crates containing food items of customer orders at a location proximate an area for customer pickup of the ordered food items. Preferably, the food items within the lined cargo space of the crate are contained within one or more grocer bags, and the method further comprises lifting the food items out of the lined cargo space by lifting each grocer bag out of the lined cargo space for handing to the customer or placing in a customer's vehicle.

In a feature, staging the crate comprises staging the crate for delivery by stacking the crate with other crates containing food items of customer orders in a cargo area of a delivery vehicle, wherein the cargo area of the delivery vehicle is a non-refrigerated space. The method preferably further comprises driving the crate to a doorstep of the customer.

In a feature, the method further comprises monitoring the temperature within each lined crate using one or more sensors contained within the liner and wirelessly transmitting temperature data from the liner. An alert preferably is provided if the temperature data indicates that a food item contained within the lined crate is at a temperature above a threshold associated with such food item.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 4 is a perspective view of the liner of FIG. 2 in an erected configuration in accordance with one or more aspects and features of the invention.

FIG. 5 is a perspective view of the liner of FIG. 4 with a first cover panel in a closed position.

FIG. 6 is a perspective view of the liner of FIG. 5 with a second cover panel now moved to a closed position.

DETAILED DESCRIPTION

Figure 1:
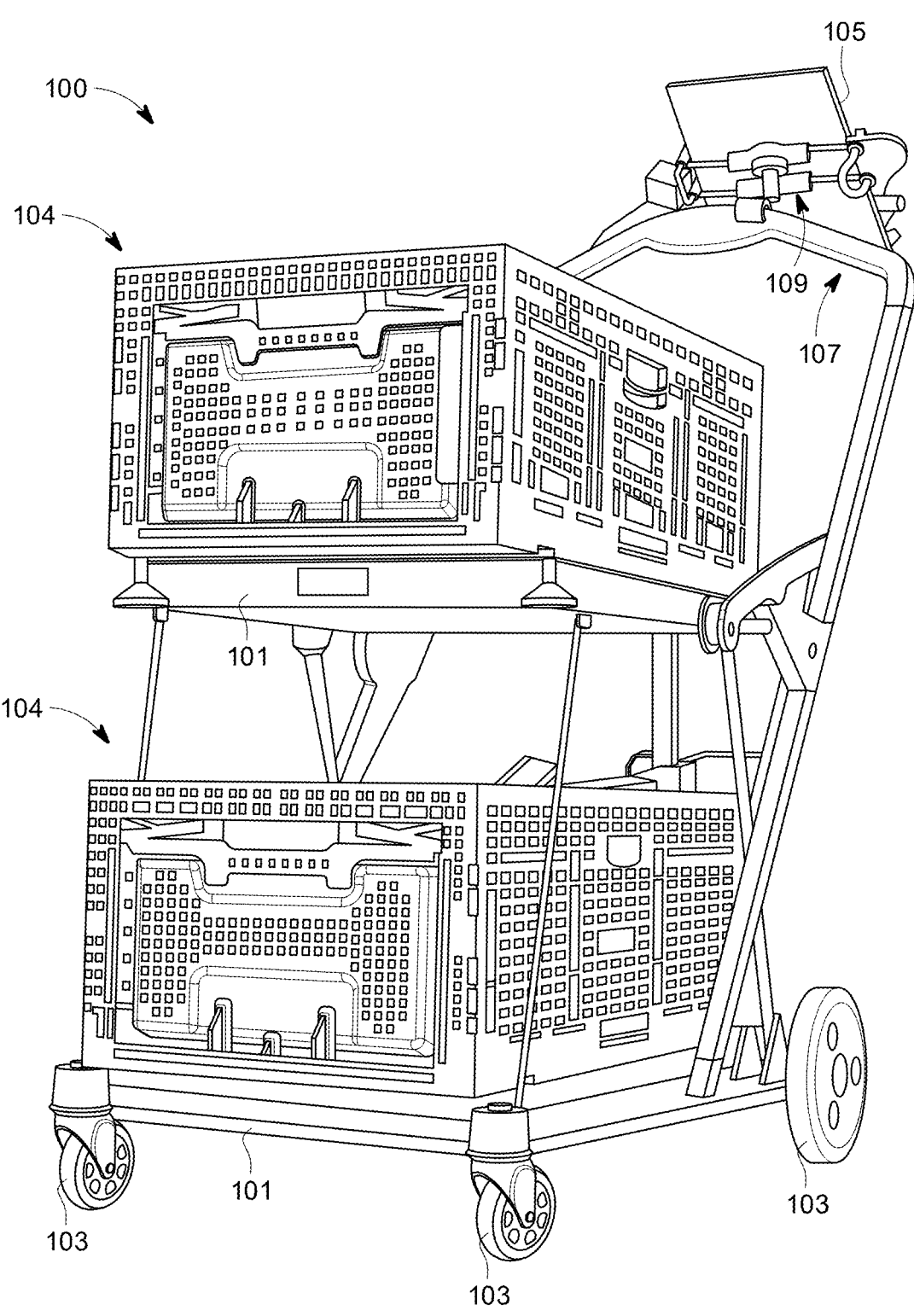
FIG. 1 is a perspective view of a cart assembly in accordance with one or more aspects and features of the invention.

As a preliminary matter, it will readily be understood by one having ordinary skill in the relevant art ("Ordinary Artisan") that the invention has broad utility and application.

Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Additionally, as generally used herein, a hinge means a "fold line", or a line along which two portions are configured to pivot or bend relative to each other. A fold line may be a stitched seam or an area of weakness compared to other areas of the two portions, which other areas may be stiffer or more rigid. Indeed, panels comprising phase change material may have fold lines defined between the phase change materials; a fold line or hinge generally would not extend through a phase change material due to the rigidity or stiffness of such material during operational use.

Referring now to the drawings, one or more preferred embodiments of the invention are next described. The following description of one or more preferred embodiments is merely exemplary in nature and is in no way intended to limit the invention, its implementations, or uses.

FIG. 1 is a perspective view of a preferred cart assembly 100 in accordance with one or more aspects and features of the invention. The cart assembly 100 comprises a cart 102 and a container assembly 104. The cart 100 comprises a platform 101 upon which a container assembly 104 rests. The platform preferrable defines a recess or rails within or between which a bottom of the container assembly is received. The cart assembly 100 may comprise a plurality of such platforms 101 each having a container assembly 104 positioned thereon, as shown in FIG. 1. The cart assembly 100 further comprises four wheels 103 and a handle 105 by which the cart assembly is manually pushed or pulled. The cart assembly further preferably comprises an electronic tablet or other electronic device 105, such as an iPad®, that is attached to the handle 107 by a mount 109. The cart 102 is shown without the electronic device and mount in FIG. 16. The cart preferably is collapsible for storage when not in use.

Each container assembly 104 comprises a crate 106 and a removable liner 108. The crate 106 also preferably is collapsible and stackable with other similar crates 106 when not in use, and the liner 108 preferably is collapsible and stackable with other similar liners 108 when not in use.

Figure 2:
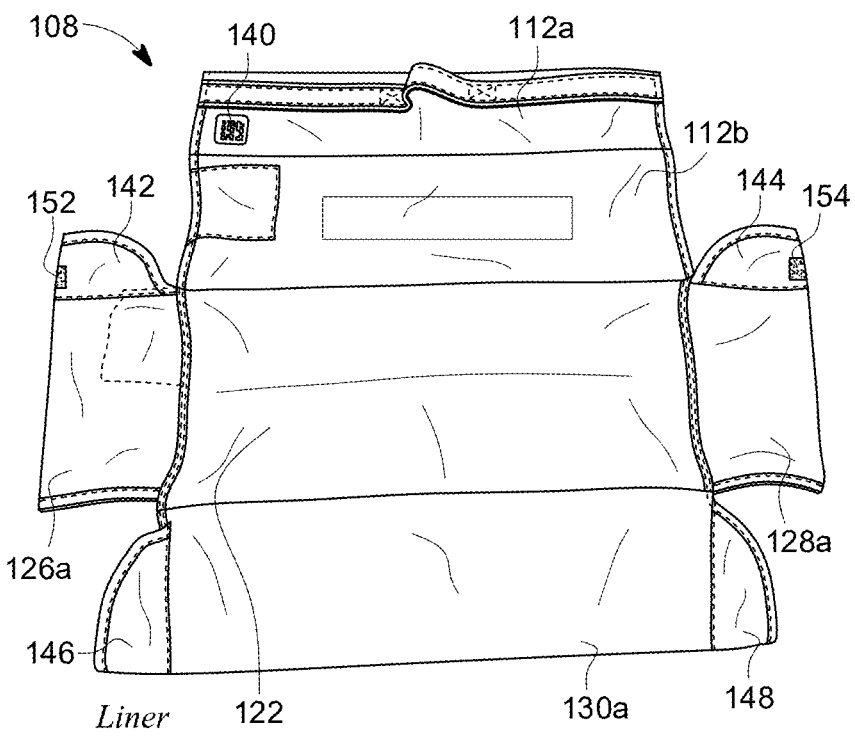
FIG. 2 is a top view of a liner in a collapsed configuration in accordance with one or more aspects and features of the invention.
Figure 3:
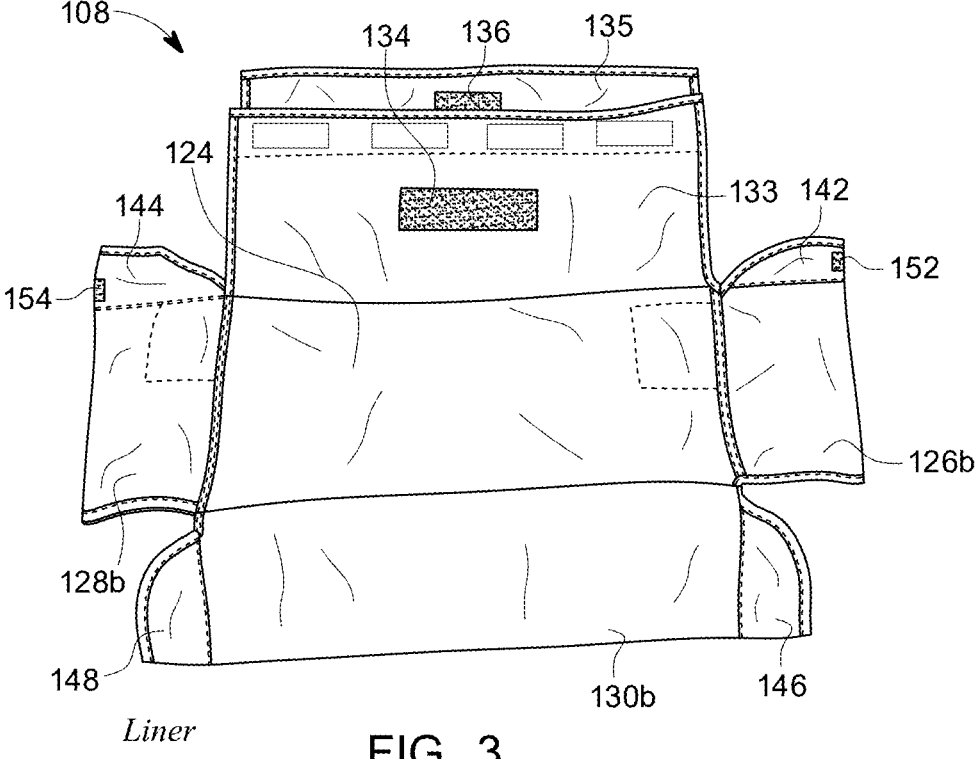
FIG. 3 is a bottom view of the liner of FIG. 2.

FIG. 2 is a top view of the liner 108 in a collapsed configuration in accordance with one or more aspects and features of the invention, and FIG. 3 is a bottom view of the liner 108 in a collapsed configuration in accordance with one or more aspects and features of the invention. In the collapsed configuration, the liner 108 preferably has a slim height, for example, a height of around one inch.

In contrast, FIG. 4 is a perspective view of the liner 108 in an erected configuration in accordance with one or more aspects and features of the invention, and FIG. 5 is a perspective view of the liner 108 with a first cover panel 110 in a closed position. FIG. 6 is a perspective view of the liner 108 with a second cover panel 112 also in a closed position. The liner 108 when erected as shown in FIG. 6 preferably has outer dimensions of 22 inches by 13.5 inches by 9.5 inches. In contrast, the liner 108 when collapsed preferably has outer dimensions of 33.5 inches by 27.25 inches by 1 inch.

Figure 7:
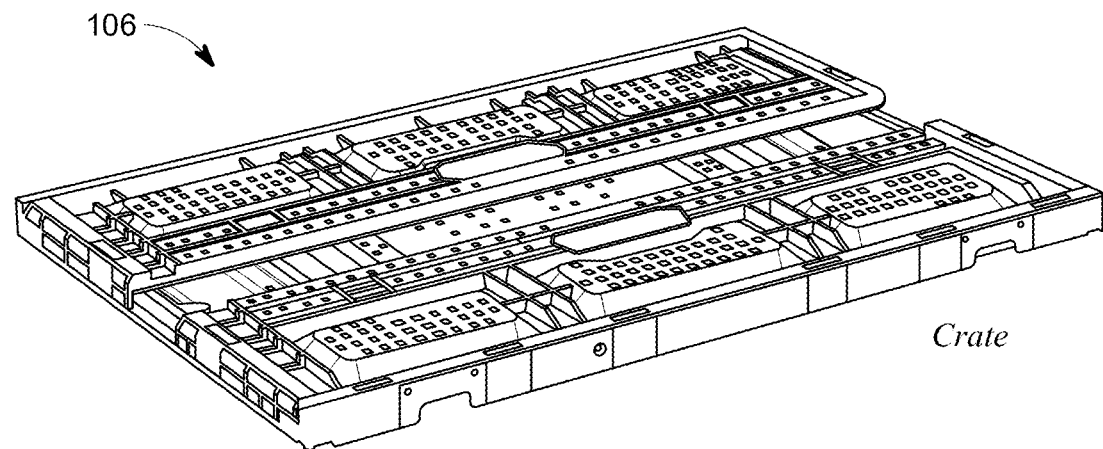
FIG. 7 is a perspective view of a crate in a collapsed configuration in accordance with one or more aspects and features of the invention.
Figure 8:
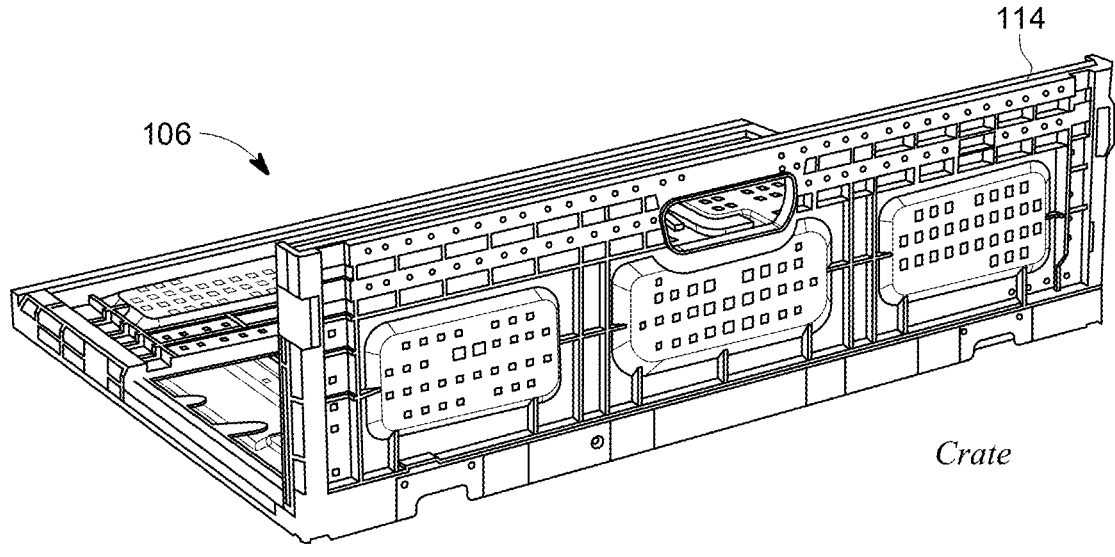
FIG. 8 is a perspective view of the crate of FIG. 7 with a front wall in an erected configuration.
Figures 9, 10, 11:
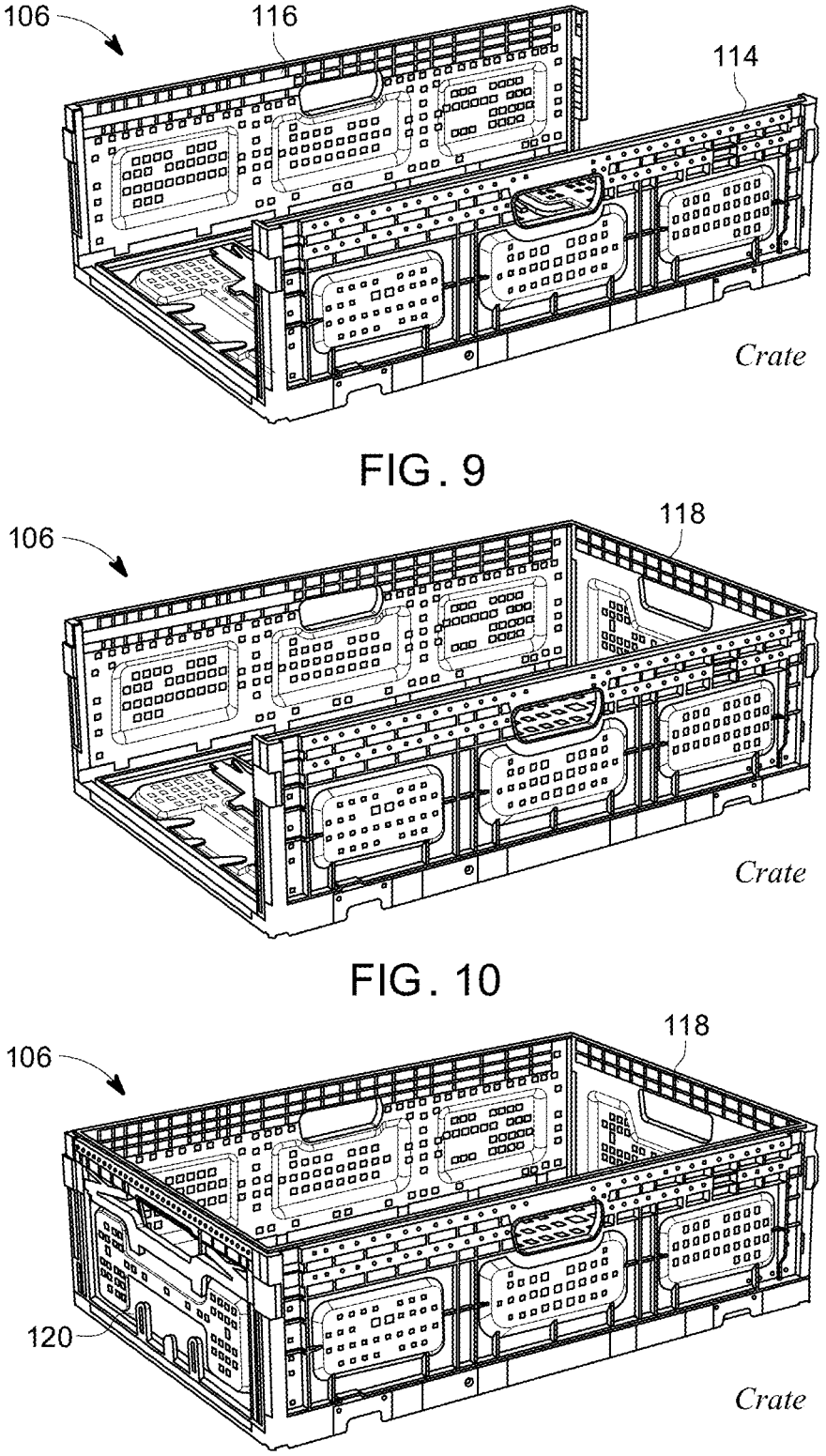
FIG. 9 is a perspective view of the crate of FIG. 8 with a back wall in an erected configuration.
FIG. 10 is a perspective view of the crate of FIG. 9 with a first end wall in an erected configuration.
FIG. 11 is a perspective view of the crate of FIG. 10 with a second end wall in an erected configuration.

FIG. 7 is a perspective view of the crate 106 in a collapsed configuration in accordance with one or more aspects and features of the invention. FIG. 8 is a perspective view of the crate 106 with a front wall 114 in an erected configuration, and FIG. 9 is a perspective view of the crate 106 with a back wall 116 in an erected configuration. FIG. 10 is a perspective view of the crate 106 with a first end wall 118 in an erected configuration, and FIG. 11 is a perspective view of the crate 106 with a second end wall 120 in an erected configuration. The crate 106 when erected as shown in FIG. 11 preferably has outer dimensions of 23.5 inches by 15.75 inches by 9.5 inches.

Figures 12, 13, 14, 15:
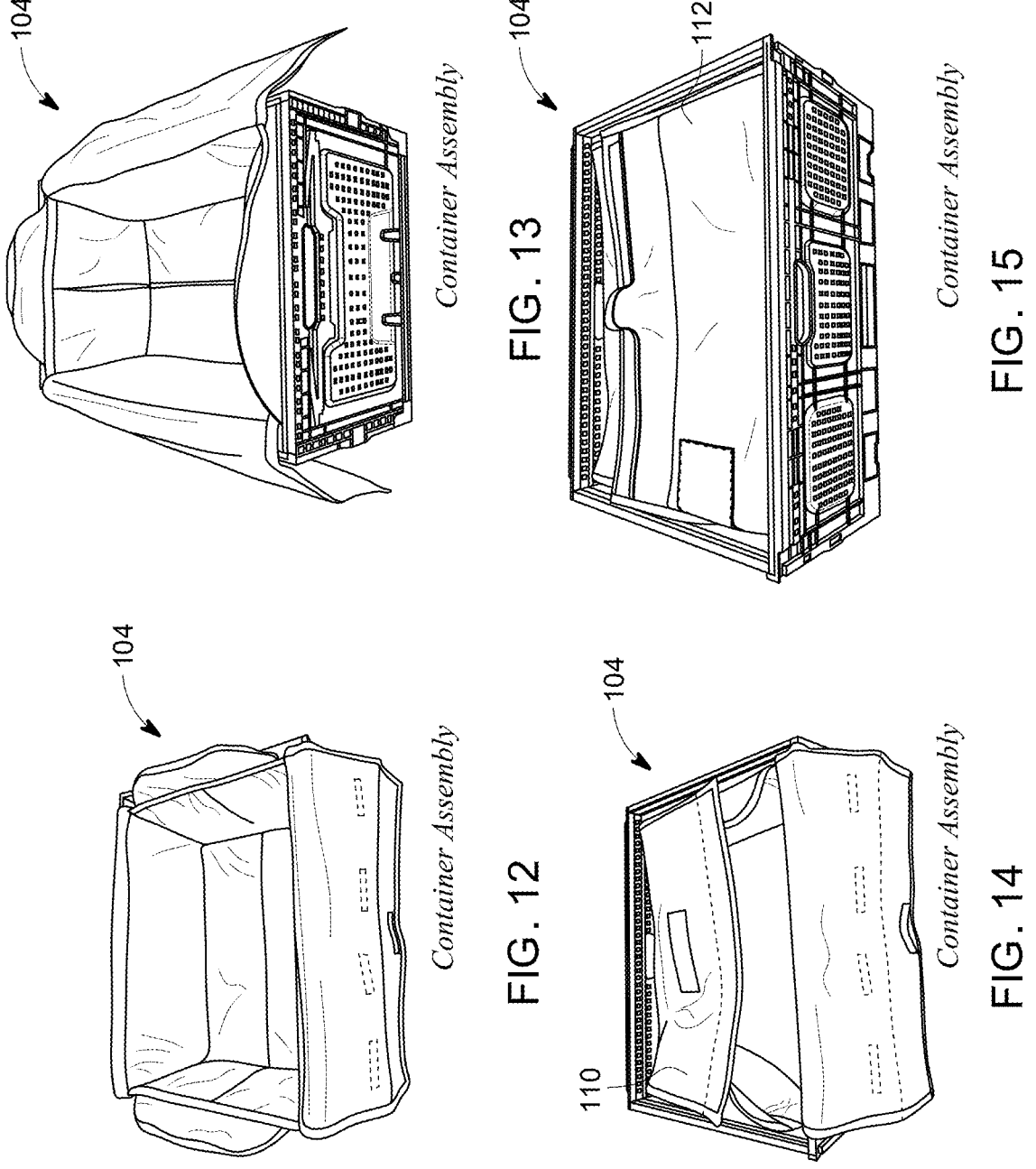
FIG. 12 is a perspective view of a container assembly in an open position in accordance with one or more aspects and features of the invention.
FIG. 13 is another perspective view of the container assembly of FIG. 13.
FIG. 14 is a perspective view of the container assembly of FIG. 12 with a first cover panel in a closed position.
FIG. 15 is a perspective view of the container assembly of FIG. 14 with a second cover panel also in a closed position.

FIG. 12 is a perspective view of the container assembly 104 in an open position in accordance with one or more aspects and features of the invention, and FIG. 13 is another perspective view of the container assembly 104 in the open position. FIG. 14 is a perspective view of the container assembly 104 with the first cover panel 110 in a closed position, and FIG. 15 is a perspective view of the container assembly 104 with the second cover panel 112 also in a closed position.

Figure 16:
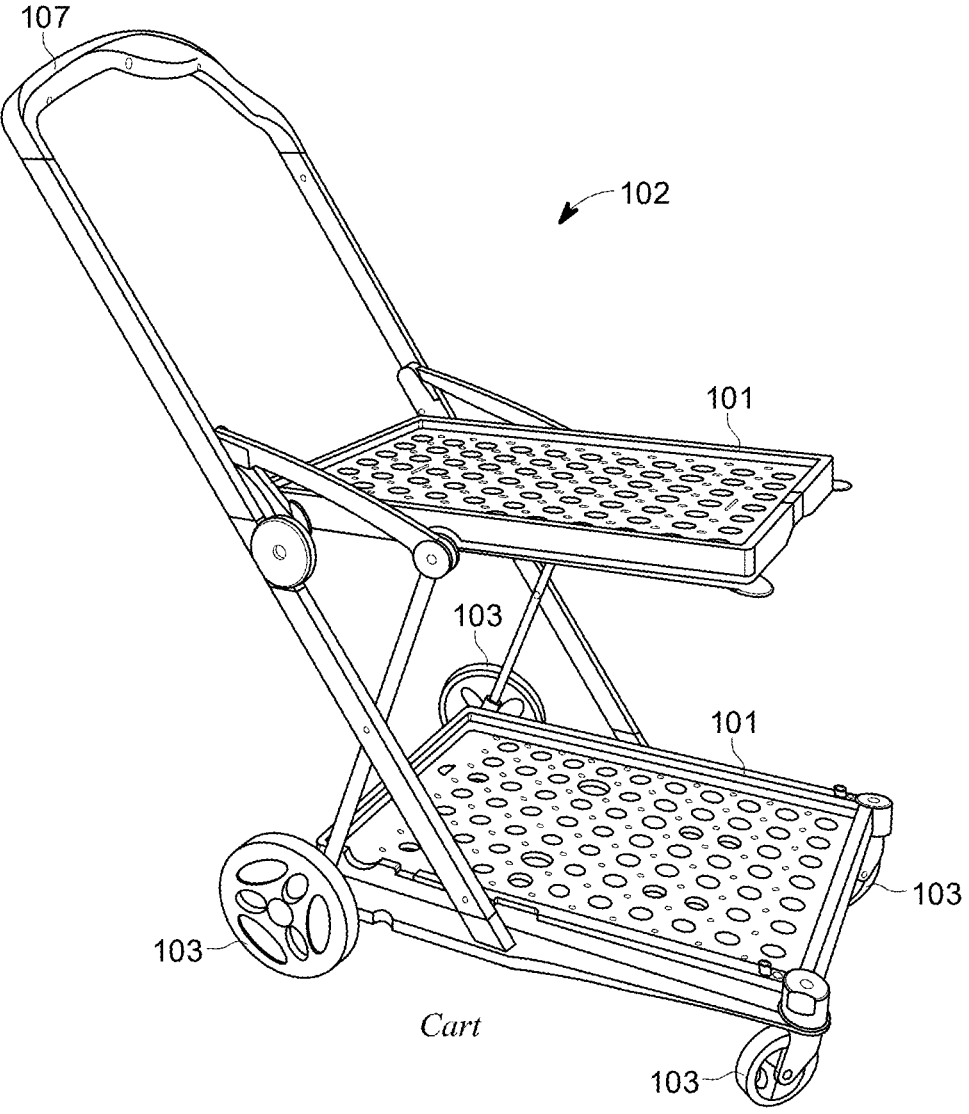
FIG. 16 is a perspective view of a cart in an erected configuration in accordance with one or more aspects and features of the invention.

FIG. 16 is a perspective view of the cart 102 in an erected configuration in accordance with one or more aspects and features of the invention.

With further regard to the liner 108, the liner 108 preferably is constructed from 70 Denier nylon and is water resistant. The liner 108 comprises panels, each defined by one or more exterior walls and one or more interior walls that define therebetween spaces in which PCM components are contained. The PCM components comprise phase change material (PCM). As used herein, phase change materials comprise substances that absorb and release large amounts of thermal energy at their phase-change temperatures. The PCM components preferably comprise a bio-based phase change material. The PCM components containing the phase change material preferably comprise non-insulating encasements that conduct thermal energy, in which encasements the phase change material is enclosed. Each encasement may be generally plank shaped with rectangular profile and of a size corresponding to a panel or subpanel in which it is contained. One or more encasements may be contained in a panel or subpanel.

The panels of the liner 108 comprise a front panel 122, a back panel 124, a first end panel 126, and a second end panel 128. The first end panel 126 preferably comprises a pair of subpanels 126a,126b that are connected along a hinge 127 for pivoting movement therebetween, and the second end panel 128 preferably comprises a pair of subpanels 128a, 128b that are connected along a hinge 129 for pivoting movement therebetween. The liner 108 further comprises a bottom panel 130 that preferably comprises two subpanels 130a,130b also that are connected along a hinge 131 for pivoting movement therebetween. All three hingers 127,129, 131 lie within a plane, whereby the liner 108 is transitionable between a collapsed configuration shown in FIGS. 2 and 3, and an erected configuration shown in FIGS. 4, 5, and 6.

The panels of the liner 108 further comprise a first cover panel 110 that is connected along a hinge 109 to a top of the back panel 124 for pivoting movement therebetween; and a second cover panel 112 that is connected along a hinge 111 to a top of the front panel 122 for pivoting movement therebetween. The second cover panel 112 itself comprises subpanels 112a,112b that are connected together along a hinge 113 for pivoting movement therebetween. The first cover panel 110 and second cover panel 112 when in the closed positions cover and enclose the top opening of the liner 108, with the second cover panel 112 overlapping and extending over the first cover panel 110. The outside wall 133 of the first cover panel 110 preferably includes a first fastening component 134 and the inside wall of the second cover panel 112 preferably includes a second fastening component 136 that engages the first fastening component 134 for securing the two cover panels 110,112 in their closed positions. These fastening components 134,136 preferably comprise hook-and-loop fasteners, such as Velcro® strips. Magnetic fastening components alternatively could be used. The second cover panel 112 further comprises a handle 138 for pulling apart and separating the second cover panel 112 from the first cover panel 110 when secured together by the fastening component 134,136.

For purposes of sealing and insulating the interior cargo space defined by the liner 108 when in the erected position with the first and second cover panels 110,112 secured together in their closed positions, the liner 108 comprises a pair of upper flaps 142,144 and a pair of lower flaps 146,148. The first upper flap 142 is connected by a hinge along a top of the first end panel 126, and the second upper flap 144 is connected by a hinge along a top of the second end panel 128. The first lower flap 146 is connected by a hinge along a bottom of the first end panel 126, and the second lower flap 148 is connected by a hinge along a bottom of the second end panel 128. The upper flaps 142,144 are tucked under the cover panels 110,112 in the closed position for scaling the interior cargo space along the upper side edges. Each upper flap 142,144 preferably includes a fastening component that mates with a corresponding fastening component located on the inside wall of the first cover panel. For example, upper flap 142 comprises fastening component 152 that engages fastening component 156 that is fixed to the inside wall 155 of the first cover panel 110. Similarly, upper flap 144 comprises fastening component 154 that engages a fastening component 158 that also is fixed to the inside wall 155 of the first cover panel 110. These fastening components 142,144 preferably comprise hook-and-loop fasteners, such as Velcro® strips. Magnetic fastening components alternatively could be used.

The liner 108 preferably comprises a machine-readable unique identifier 140 in the form of a bar code, passive RFID tag, or the like, for identifying the liner 108 using an external device. While not shown, the liner 108 also preferably comprises one or more temperature sensors and electronic components including a microprocessor or controller, a transceiver, and memory for monitoring, recording, and/or communicating temperature data.

Similarly, the crate 106 preferably comprises a machine-readable unique identifier 240 (see FIG. 20) in the form of a bar code, passive RFID tag, or the like, for identifying the crate using an external device.

One or more preferred methods will now be described in accordance with one or more aspects and features of the invention.

Figures 17, 18, 19:
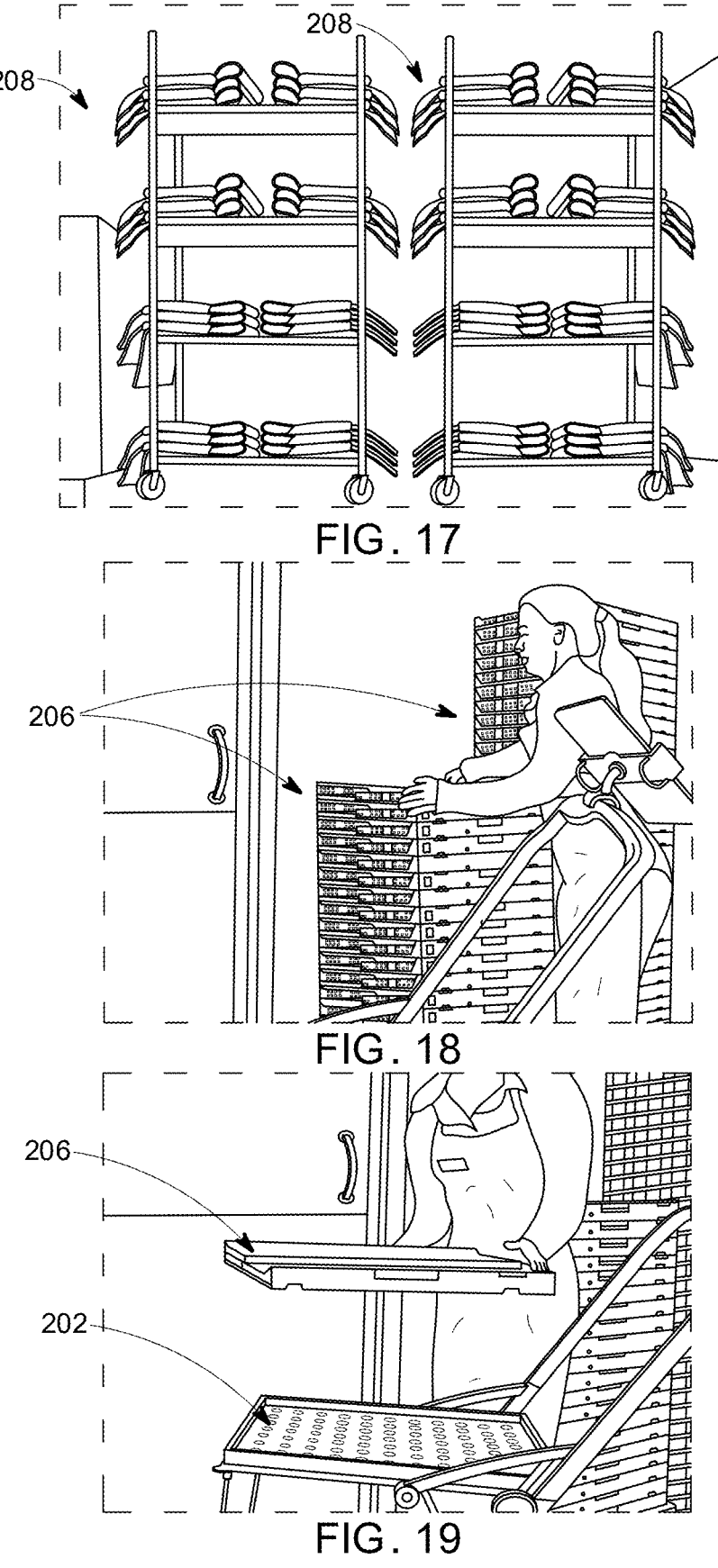
FIG. 17 is a perspective view of a plurality of stacks of liners being stored in a walk-in freezer in accordance with one or more aspects and features of the invention.
FIG. 18 is a perspective view of a plurality of stacks of crates each in a collapsed configuration being stored outside of a walk-in freezer in accordance with one or more aspects and features of the invention.
FIG. 19 is a perspective view of a crate in a collapsed configuration being placed on a cart in an erected configuration in accordance with one or more aspects and features of the invention.

When not in use, the liners in their collapsed configurations are stacked and stored in a walk-in freezer. FIG. 17 is a perspective view of a plurality of stacks of liners 208 being stored in a walk-in freezer in accordance with one or more aspects and features of the invention. While stacked and stored in the freezer, the phase change material in each PCM component of the liners 208 is cooled to or below its phase change temperature.

Similarly, when not in use, the crates 206 are stored in their collapsed configurations in a stacks preferably near but not in the freezer in which the liners 208 are stored. FIG. 18 is a perspective view of a plurality of stacks of crates 206, each in a collapsed configuration being stored outside of the walk-in freezer of FIG. 17.

Figures 20, 21, 22, 23:
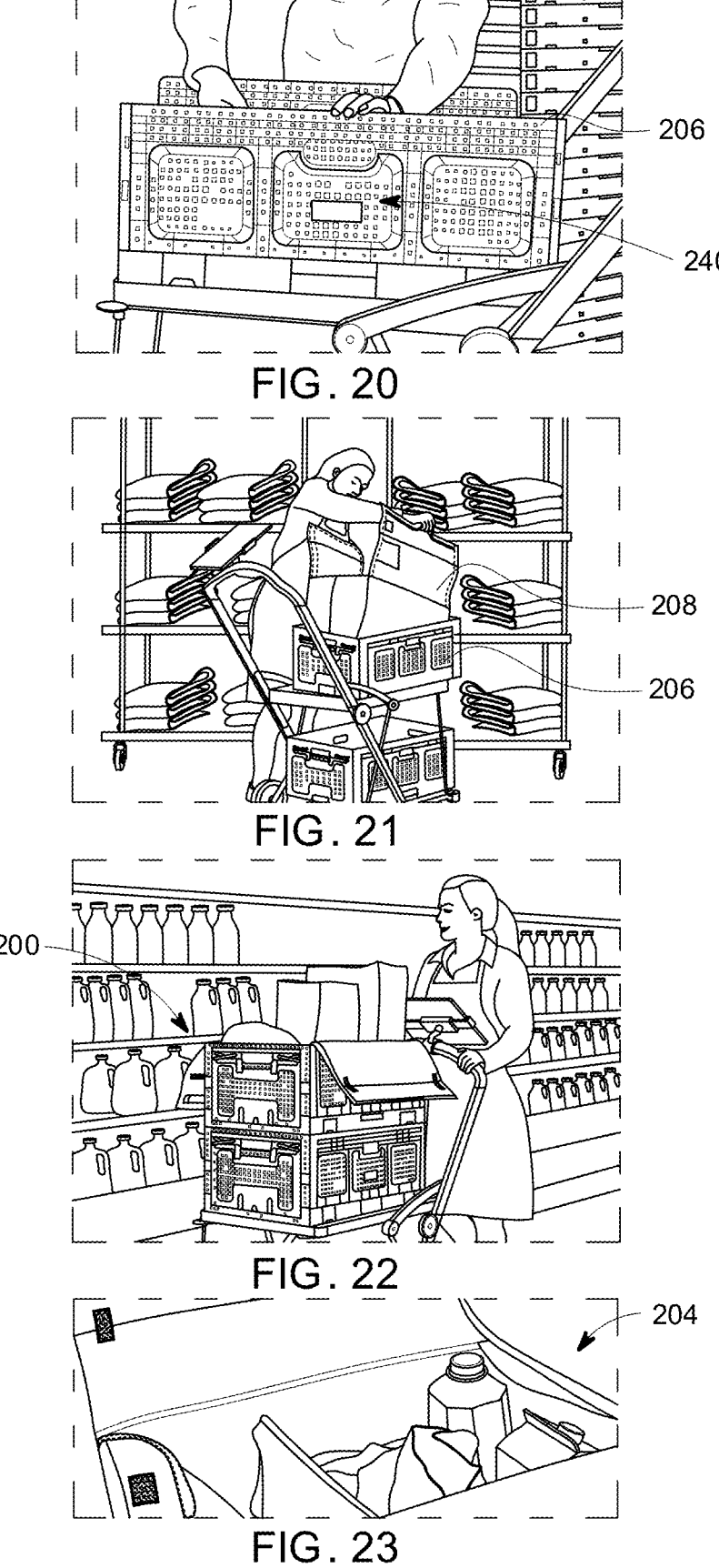
FIG. 20 is a perspective view of the crate being erected while supported on the cart of FIG. 19 in accordance with one or more aspects and features of the invention.
FIG. 21 is a perspective view of a liner being inserted within the crate of FIG. 20 on the cart to provide a cart assembly in accordance with one or more aspects and features of the invention.
FIG. 22 is a perspective view of picking using the cart assembly of FIG. 21 in accordance with one or more aspects and features of the invention.
FIG. 23 is a perspective view of exemplary food items having been picked and inserted within the container assembly resulting from the picking of FIG. 22 in accordance with one or more aspects and features of the invention.

When ready for use, a crate 206 in its collapsed configuration is removed from one of the stacks and placed on a cart 202, as shown in FIG. 19. The crate 206 then is erected by standing up each of the front wall, back wall, and end walls, as shown in FIG. 20. Alternatively, a crate 206 may be erected and then placed on a platform 201 of a cart 202.

With the crate 206 erected and positioned on a platform of the cart 202, a liner 208 is retrieved from the freezer and inserted into the erected crate 206, as shown in FIG. 21. The liner 208 is sized and dimensioned to correspond to the inner dimensions of the storage area of the crate 206 and serves as a lining of the storage area of the crate 206. The liner may be erected before insertion or after insertion within the crate. A container assembly 204 is thereby provided. This process may be repeated for each platform of the cart 202 to provide a cart assembly 200, as shown in FIG. 21.

FIG. 22 is a perspective view of picking of grocery items using the cart assembly 200. The items are picked according to an online order by a consumer for either delivery or pickup. Each item for an order is picked and placed in a container assembly 204. As the item is placed in a container assembly 204, both the item and container assembly in which the item is placed are recorded using an electronic device, of which electronic device 105 is representative. Each container assembly 204 of the cart assembly is identified by the machine-readable unique identifier 240, and each item is identified by is product bar code. The electronic device preferably includes a bar code scanner or equivalent technology. In this manner, the contents of each container assembly is known in real time, and items in each customer order further can be accounted for and those items still to be picked can be readily identified.

FIG. 23 is a perspective view of exemplary items having been picked and placed within the container assembly 204 resulting from the picking of FIG. 22. The items preferably are placed within standard grocery bags, whether paper or plastic, which bags are within the storage area of the container assembly 204 to facilitate case of transfer of the items from the container assembly 204 to a customer at the actual time of customer pickup by or customer deliver.

Once an order has been fulfilled, i.e., all items placed in one or more container assemblies 204, the container assemblies are staged for pickup by the customer or for delivery to the customer. Staging of the container assemblies need not be in a temperature-controlled environment such as a freezer locker or cooler locker. Instead, the container assemblies may be staged in any location within a store of a grocer due to the use of the liners 208 in accordance with the one or more aspects and features of the invention. Indeed, separate ice packs or gel packs are not even required. It is believed that the cold liners 208 will maintain safe temperatures of the food items contained therein for up to 10 hours.

Figure 24:
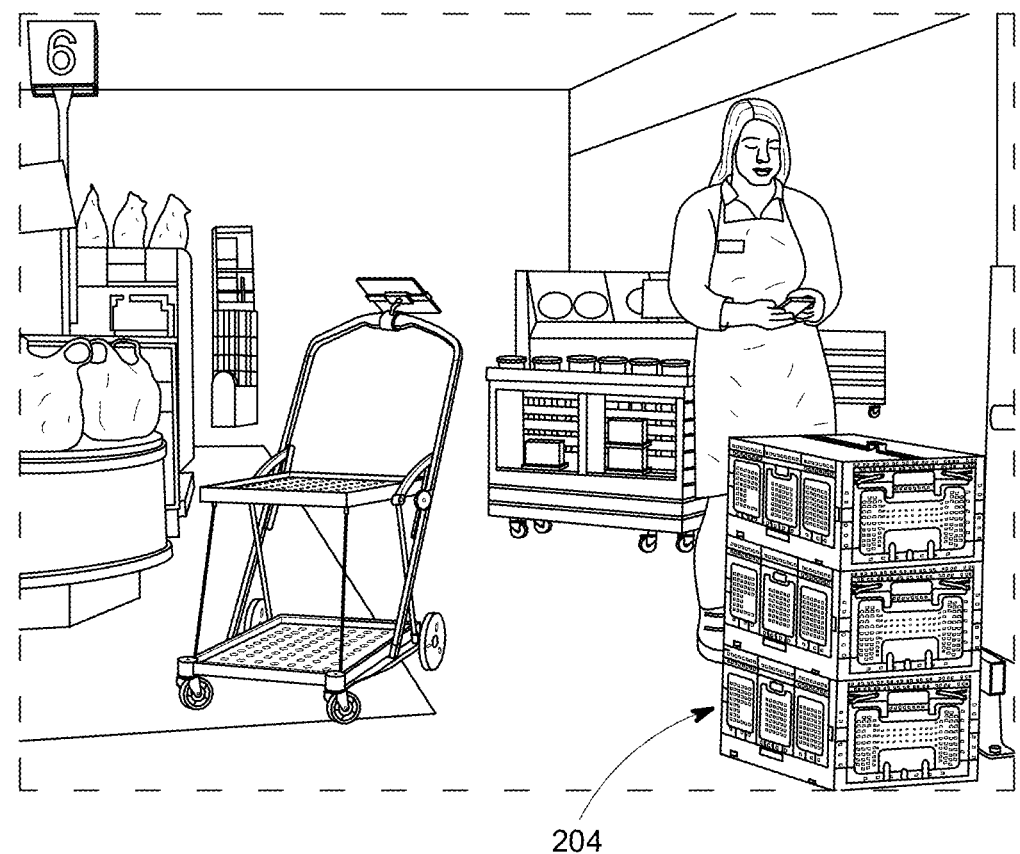
FIG. 24 is a perspective view of the staging of a stacked plurality of container assemblies each containing items picked and ready for pickup by customers in accordance with one or more aspects and features of the invention.

Thus, for example, container assemblies ready for pickup or delivery may be staged by being stacked on top of each other near the exits or cash registers in a store, as shown in FIG. 24, for convenient pickup by a customer.

It will be noted that as a result of the shape and sizes of the liners 208, the lines 208 do not interfere with the stacking of the container assemblies 204, i.e., the liners 208 in the erected configuration with the cover panels in the closed positions and secured together are completely contained within the storage space of the erected crates, as perhaps best shown in FIG. 15.

Figure 25:
FIG. 25 is a perspective view of a delivery vehicle containing a plurality of stacked container assemblies each containing items picked and ready for delivery to customers in accordance with one or more aspects and features of the invention.

Another example of the stacking of the container assemblies is shown in FIG. 25, wherein a delivery vehicle contains a plurality of stacked container assemblies 204, each containing items picked and ready for delivery to customers in accordance with one or more aspects and features of the invention. The container assemblies may be transported to the delivery vehicle on carts.

Because of the use of the liners 208 comprising the phase change material, the items placed within the container assemblies 204 may be safely maintained at temperatures consistent with food safety protocols. This includes food items that are frozen or refrigerated, including milk and other dairy products, and even ice cream. To insure safety, the temperatures are monitored and tracked using the sensors and electronics of the liners 208. In this regard, the temperature within each lined crate preferably is monitored using one or more sensors contained within the liner and temperature data is wirelessly transmitting from the liner. An alert then is provided if the temperature data indicates that a food item contained within the lined crate is at a temperature above a threshold associated with such food item for a period of time, thereby insuring freshness, quality, and food safety.

Based on the foregoing description, it will be readily understood by those persons skilled in the art that the invention has broad utility and application. Indeed, it will be appreciated that many embodiments of the invention will result in significant cost savings, decreased time, and increased productivity, all while ensuring food safety standards are met or exceeded.

Furthermore, many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention. Thus, for example, it is contemplated as part of the invention that the liners may be heated rather than cooled, and that items placed within container assemblies can be maintained at temperatures greater than ambient temperatures for long periods of times using the heated liners.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A cart assembly, comprising:
   (a) a cart comprises a platform, wheels, a push handle by which the cart assembly is manually pushed or pulled, and an electronic device attached to the handle by a mount; and
   (b) a container assembly removably supported on the platform of the cart;
   (c) wherein the container assembly comprises a crate and a liner removably received within and supported by walls of the crate;
   (d) wherein the liner comprises panels, each panel being defined by one or more exterior walls and one or more interior walls that define therebetween spaces containing a phase change material;
   (e) wherein the cart is configured to transition into a collapsed configuration for storage when not in use and the container assembly is removed from the platform;
   (f) wherein the crate is configured to transition into a collapsed configuration when not in use and the liner is removed, the crate being configured to stack on top of a second identical crate when the crates are in the collapsed configuration; and
   (g) wherein the liner is collapsible when not in use and removed from the crate.

2. The cart assembly of claim 1, wherein the phase change material is enclosed within encasements.

3. The cart assembly of claim 2, wherein each encasement has a plank shape with rectangular profile.

4. The cart assembly of claim 1, wherein the liner comprises a front panel, a back panel, a first end panel, and a second end panel, each said panel being connected along a fold line to a bottom panel for pivoting movement therebetween.

5. The cart assembly of claim 4, wherein the bottom panel comprises first and second subpanels that are connected along a fold line for pivoting movement therebetween.

6. The cart assembly of claim 4, wherein the first end panel comprises a pair of subpanels that are connected along a fold line for pivoting movement therebetween, and the second end panel comprises a pair of subpanels that are connected along a fold line for pivoting movement therebetween.

7. The cart assembly of claim 6, wherein the fold lines of the end panels and the bottom panel lie within a plane, whereby the liner is transitionable between a collapsed configuration and an erected configuration.

8. The cart assembly of claim 4, wherein the liner further comprise a first cover panel that is connected along a fold line to a top of the back panel for pivoting movement therebetween, and a second cover panel that is connected along a fold line to a top of the front panel for pivoting movement therebetween.

9. The cart assembly of claim 8, wherein the first cover panel and the second cover panel, when in their closed positions, are configured to cover a top opening of the liner.

10. The cart assembly of claim 9, wherein the second cover panel overlaps and extends over the first cover panel when the first and second cover panels are in their closed positions.

11. The cart assembly of claim 9, wherein an outside wall of the first cover panel includes a first fastening component and an inside wall of the second cover panel includes a second fastening component that engages the first fastening component for securing the first and second cover panels in their closed positions.

12. The cart assembly of claim 11, wherein the fastening components comprise hook-and-loop fasteners, and wherein the second cover panel comprises a handle to facilitate separating the second cover panel from the first cover panel when secured together by the fastening components.

13. The cart assembly of claim 11, wherein the fastening components comprise magnetic fasteners, and wherein the second cover panel comprises a handle to facilitate separating the second cover panel from the first cover panel when secured together by the fastening components.

14. The cart assembly of claim 8, wherein the liner further comprises a pair of upper flaps and a pair of lower flaps.

15. The cart assembly of claim 14, wherein the first upper flap is connected by a fold line along a top of the first end panel, and the second upper flap is connected by a hinge along a top of the second end panel.

16. The cart assembly of claim 14, wherein the first lower flap is connected by a hinge along a bottom of the first end panel, and the second lower flap is connected by a hinge along a bottom of the second end panel.

17. The cart assembly of claim 14, wherein the upper flaps are tucked under the first and second cover panels when in their closed positions for sealing an interior cargo space along upper side edges thereof.

18. The cart assembly of claim 17, wherein each upper flap comprises a fastening component that mates with a corresponding fastening component located on an inside wall of the first cover panel.

19. The cart assembly of claim 1, wherein the liner comprises a machine-readable unique identifier and the crate comprises another machine-readable unique identifier.

20. The cart assembly of claim 1, wherein the liner comprises one or more temperature sensors and electronic components including a microprocessor or controller, a transceiver, and memory for monitoring, recording, and/or communicating temperature data.

\* \* \* \* \*